(12) United States Patent
Aziz et al.

(10) Patent No.: US 8,902,963 B2
(45) Date of Patent: Dec. 2, 2014

(54) METHODS AND APPARATUS FOR DETERMINING THRESHOLD OF ONE OR MORE DFE TRANSITION LATCHES BASED ON INCOMING DATA EYE

(75) Inventors: Pervez M Aziz, Dallas, TX (US); Mohammad S Mobin, Orefield, PA (US)

(73) Assignee: Agere Systems Inc., Allentown, PA (US)

( * ) Notice: Subject to any disclaimer, the term of this patent is extended or adjusted under 35 U.S.C. 154(b) by 1129 days.

(21) Appl. No.: 11/864,110

(22) Filed: Sep. 28, 2007

(65) Prior Publication Data

US 2009/0086807 A1    Apr. 2, 2009

(51) Int. Cl.
*H03K 5/159* (2006.01)
*H04L 25/03* (2006.01)

(52) U.S. Cl.
CPC ...... *H04L 25/03063* (2013.01); *H04L 25/0307* (2013.01)
USPC .......................................... 375/233

(58) Field of Classification Search
USPC .......................................... 375/233
See application file for complete search history.

(56) References Cited

U.S. PATENT DOCUMENTS

| | | | |
|---|---|---|---|
| 6,452,433 B1 * | 9/2002 | Chang et al. .................. | 327/202 |
| 7,599,461 B2 * | 10/2009 | Aziz et al. ..................... | 375/373 |
| 7,640,463 B2 * | 12/2009 | Windler et al. ............... | 714/707 |
| 7,697,603 B1 * | 4/2010 | Wang et al. ................... | 375/233 |
| 2002/0085656 A1 * | 7/2002 | Lee et al. ....................... | 375/355 |
| 2005/0238093 A1 * | 10/2005 | Payne et al. ................... | 375/224 |
| 2006/0067440 A1 * | 3/2006 | Hsu et al. ....................... | 375/345 |
| 2007/0104292 A1 * | 5/2007 | Gregorius ..................... | 375/327 |
| 2007/0147555 A1 * | 6/2007 | Mobin et al. .................. | 375/345 |
| 2007/0177702 A1 * | 8/2007 | Sanders et al. ................ | 375/375 |
| 2007/0195874 A1 * | 8/2007 | Aziz et al. ..................... | 375/233 |
| 2007/0206670 A1 * | 9/2007 | Aziz .............................. | 375/233 |
| 2007/0268984 A1 * | 11/2007 | Abel et al. ..................... | 375/285 |
| 2008/0005629 A1 * | 1/2008 | Windler et al. ............... | 714/712 |
| 2008/0080610 A1 * | 4/2008 | Aziz et al. ..................... | 375/233 |
| 2008/0198916 A1 * | 8/2008 | Zeng et al. ..................... | 375/233 |
| 2008/0225734 A1 * | 9/2008 | Daugherty et al. ........... | 370/252 |
| 2008/0298520 A1 * | 12/2008 | Hsu et al. ...................... | 375/345 |
| 2008/0310495 A1 * | 12/2008 | Bulzacchelli et al. ........ | 375/233 |
| 2009/0086807 A1 * | 4/2009 | Aziz et al. ..................... | 375/233 |
| 2009/0097541 A1 * | 4/2009 | Aziz et al. ..................... | 375/233 |

* cited by examiner

*Primary Examiner* — Santiago Garcia
(74) *Attorney, Agent, or Firm* — Sheridan Ross, P.C.

(57) ABSTRACT

Methods and apparatus are provided for determining the threshold position of one or more DFE latches using an evaluation of the incoming data eye. A threshold position is determined for one or more transition latches employed by a decision-feedback equalizer by obtaining a plurality of samples of a data eye using a data eye monitor; obtaining a vertical eye opening metric from the data eye monitor; and determining the threshold position for the one or more transition latches based on the vertical eye opening metric. A decision-feedback equalizer is also disclosed that comprises at least one data latch having a data threshold; and at least one transition latching having a transition threshold, wherein the transition threshold and the data threshold ate unequal.

22 Claims, 9 Drawing Sheets

FIG. 2

| $\hat{y}(n-1)$ | $\hat{y}(n-1/2)$ | $\hat{y}(n)$ | PDOUT |
|---|---|---|---|
| 0 | 0 | 0 | 0 (NO DATA TRANSITION) |
| 0 | 0 | 1 | −1 |
| 0 | 1 | 0 | 0 |
| 0 | 1 | 1 | 1 |
| 1 | 0 | 0 | 1 |
| 1 | 0 | 1 | 0 |
| 1 | 1 | 0 | −1 |
| 1 | 1 | 1 | 0 (NO DATA TRANSITION) |

FIG. 6     600

| $\hat{y}_d(n-1)$ | $\hat{y}_{dt}(n)$ | $\hat{y}_d(n)$ | DFE_PDOUT |
|---|---|---|---|
| 0 | 0 | 0 | 0 (NO DATA TRANSITION) |
| 0 | 0 | 1 | −1 |
| 0 | 1 | 0 | 0 |
| 0 | 1 | 1 | 1 |
| 1 | 0 | 0 | 1 |
| 1 | 0 | 1 | 0 |
| 1 | 1 | 0 | −1 |
| 1 | 1 | 1 | 0 (NO DATA TRANSITION) |

# METHODS AND APPARATUS FOR DETERMINING THRESHOLD OF ONE OR MORE DFE TRANSITION LATCHES BASED ON INCOMING DATA EYE

CROSS-REFERENCE TO RELATED APPLICATIONS

The present application is related to U.S. patent application Ser. No. 11/540,946, filed Sep. 29, 2006, entitled "Method and Apparatus for Determining Latch Position for Decision-Feedback Equalization Using Single-Sided Eye," and U.S. patent application Ser. No. 11/686,148, filed Mar. 14, 2007, entitled "Method and Apparatus for Decision-feedback Equalization Using Single-Sided Eye with Global Minimum Convergence," each incorporated by reference herein.

FIELD OF THE INVENTION

The present invention relates generally to decision-feedback equalization techniques, and more particularly, to techniques for determining the threshold of one or more latches employed for decision-feedback equalization.

BACKGROUND OF THE INVENTION

Digital communication receivers must sample an analog waveform and then reliably detect the sampled data. Signals arriving at a receiver are typically corrupted by intersymbol interference (ISI), crosstalk, echo, and other noise. Thus, receivers must jointly equalize the channel, to compensate for such distortions, and decode the encoded signals at increasingly high clock rates. Decision-feedback equalization (DFE) is a widely-used technique for removing intersymbol interference and other noise. For a detailed discussion of decision feedback equalizers, see, for example, R. Gitlin et al., Digital Communication Principles, (Plenum Press 1992) and E. A. Lee and D. G. Messerschmitt, Digital Communications, (Kluwer Academic Press, 1988), each incorporated by reference herein. Generally, decision-feedback equalization utilizes a nonlinear equalizer to equalize the channel using a feedback loop based on previously decided symbols.

In one typical DFE implementation, a received analog signal is sampled and compared to one or more thresholds to generate the detected data. A DFE correction, v(t), is subtracted in a feedback fashion to produce a DFE corrected signal w(t). The same clock, generated from the received signal by a clock and data recovery (CDR) circuit, is generally used to sample the incoming signal and for the DFE operation.

In many DFE applications, the Least Mean Square algorithm positions the vertical slicers by evaluating an error term for a known receive data stream. Such known receive data streams, however, are not always available. A need exists for improved methods and apparatus for decision-feedback equalization. A further need exists for methods and apparatus that determine the threshold of one or more DFE latches using an evaluation of the incoming data eye.

SUMMARY OF THE INVENTION

Generally, methods and apparatus are provided for determining the threshold position of one or more DFE latches using an evaluation of the incoming data eye. According to one aspect of the invention, a threshold position is determined for one or more transition latches employed by a decision-feedback equalizer by obtaining a plurality of samples of a data eye using a data eye monitor; obtaining a vertical eye opening metric from the data eye monitor; and determining the threshold position for the one or more transition latches based on the vertical eye opening metric.

In one embodiment, the vertical eye opening metric is based on statistics of DFE detected data and samples obtained using at least one roaming latch. For example, the vertical eye opening metric can measure a degree of opening of a data eye. The vertical eye opening metric can be obtained for a plurality of transition latch settings and the threshold position for the one or more transition latches can be determined by selecting the transition latch setting that approximately maximizes the vertical eye opening metric.

According to a further aspect of the invention, a decision-feedback equalizer is disclosed. The decision-feedback equalizer comprises at least one data latch having a data threshold; and at least one transition latching having a transition threshold, wherein the transition threshold and the data threshold ate unequal. The at least one transition threshold may vary over time. The decision-feedback equalizer optionally includes a data eye monitor that generates a vertical eye opening metric that is used to determine the transition threshold.

A more complete understanding of the present invention, as well as further features and advantages of the present invention, will be obtained by reference to the following detailed description and drawings.

BRIEF DESCRIPTION OF THE DRAWINGS

FIG. 2 is a table characterizing the input/output relationship of the BBPD of FIG. 1;

FIG. 6 is a sample truth table for the exemplary DFE equalized BBPD of FIG. 5;

DETAILED DESCRIPTION

Figure 1:
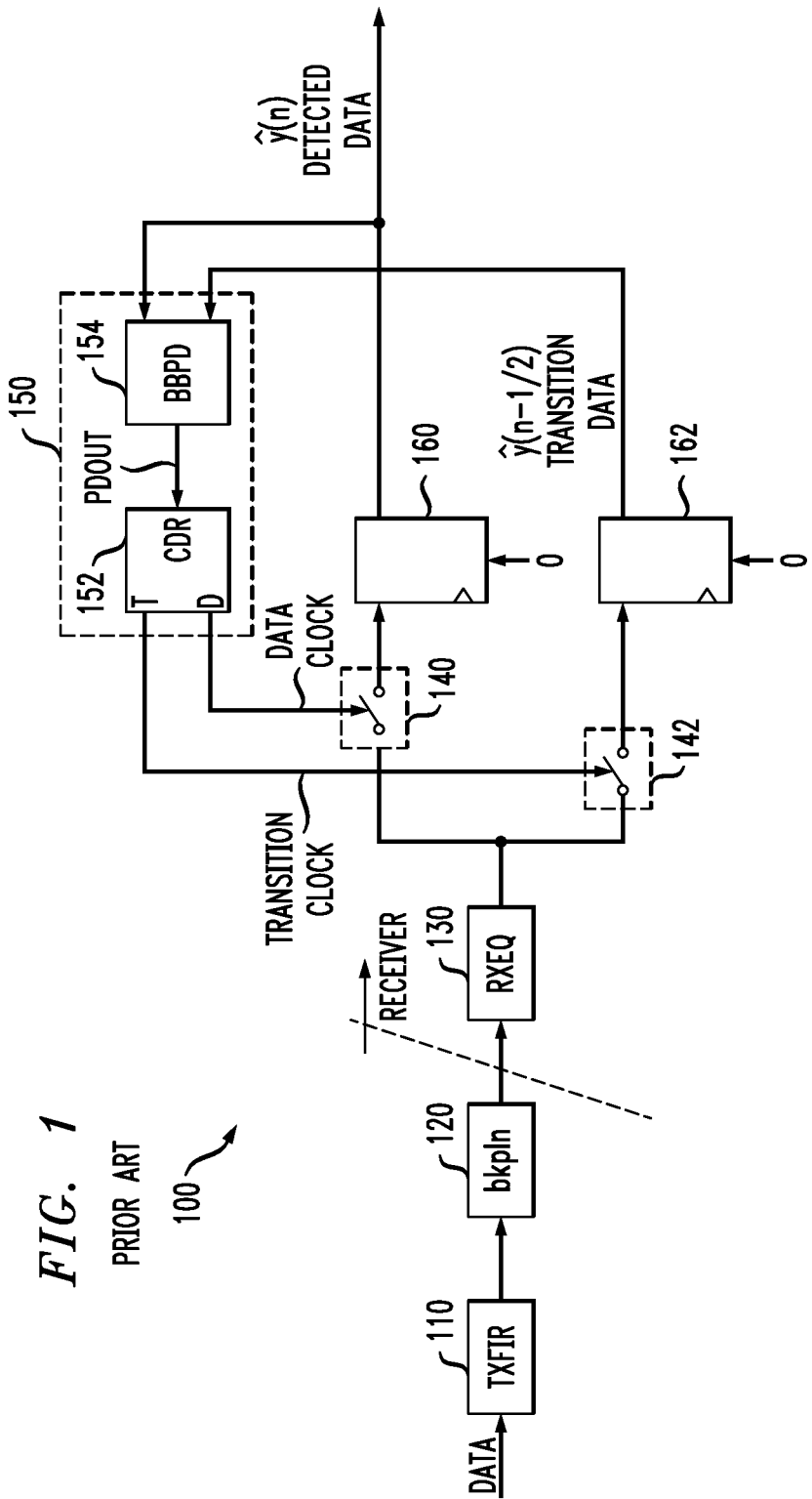
FIG. 1 is a block diagram of a conventional sterilizer/deserializer communication channel having a channel impairment.

The present invention provides methods and apparatus for determining a threshold for one or more DFE latches. FIG. 1 is a block diagram of a conventional serializer/deserializer communication channel 100 having a channel impairment that is due, for example, to a physical transmission medium, such as a backplane or drive head in a magnetic recording system. In the exemplary implementation shown in FIG. 1, the data is transmitted through a backplane channel 120 after optionally being equalized or filtered through a transmit FIR filter (TXFIR) 110. After passing though the backplane 120, the analog signal may optionally be filtered or equalized by a receive equalizer (RXEQ) 130 which may consist, for example, of a continuous time filter. The analog signal out of the RXEQ 130 is sampled at the baud rate by a switch 140 using a sampling clock generated by a clock/data recovery (CDR) circuit 150. A data detector 160 (or a slicer) digitizes the sample and compares the digitized sample to an exemplary threshold of zero, using the CDR recovered clock.

The phase of the analog waveform is typically unknown and there may be a frequency offset between the frequency at which the original data was transmitted and the nominal receiver sampling clock frequency. The function of the CDR 150 is to properly sample the analog waveform such that when the sampled waveform is passed through a data detector 160, the data is recovered properly despite the fact that the phase and frequency of the transmitted signal is not known. The CDR 150 is often an adaptive feedback circuit and the feedback loop must adjust the phase and frequency of the nominal clock to produce a modified recovered clock that can sample the analog waveform to allow proper data detection.

As previously indicated, the data detector 160 can be implemented as a slicer (i.e., a decision device based on an amplitude threshold) or a more complicated detector such as a sequence detector. For high speed applications, the data detector 160 is often implemented as a slicer that is clocked by the CDR clock. In addition to sampling the data signal, the slicer 160 essentially quantizes the signal to a binary "1" or "0" based on the sampled analog value and a slicer threshold, $s_t$. If the input to the slicer 160 at time n is w(n), then the output, $\hat{y}(n)$, of the slicer 160 is given as follows:

$$\hat{y}(n) = 1 \text{ if } w(n) > s_t \quad (1)$$
$$= 0 \text{ otherwise}$$

In general, the CDR 150 may be composed of several components, such as a phase detector (PD), a loop filter, and a clock generation circuit. As shown in FIG. 1, the exemplary CDR 150 is comprised of a loop filter 152 embodied as a digital loop filter (CDR loop filter and clock generation) and a phase detector 154 embodied as a bang-bang phase detector (BBPD). For a discussion of bang-bang phase detector, see, foe example, J. D. H. Alexander, "Clock Recovery from Random Binary Signals," Electronics Letters, 541-42 (October, 1975), incorporated by reference herein.

The BBPD 154 processes several quantities to compute an estimate of timing adjustment needed to properly sample the signal, in a known manner. The timing adjustment is filtered by the loop 152 before adjusting the phase of the sampling clocks. For the BBPD 154, there needs to be two sampling clocks: a data sampling clock which samples the recovered data and a transition sampling clock that is offset from the data clock by half a band period T/2 and which samples the "transition" data. The transition sample data is denoted as $\hat{y}(n-\frac{1}{2})$ to indicate is sampled relative to $\hat{y}(n)$ by a phase offset of T/2. In addition, the BBPD 154 makes use of a one baud period delayed version of the recovered data. The delayed data is $\hat{y}(n-1)$ (not shown explicitly in FIG. 1). Generally, the delayed data, $\hat{y}(n-1)$, can be created internally by the BBPD 154 from $\hat{y}(n)$. The BBPD input/output relationship is characterized by the look up table 200 shown in FIG. 2. Since the BBPD 154 requires more than one sample per baud period, the BBPD 154 is classified as an oversampled phase detector

DFE Background

As data rates increase for serializer/deserializer applications, the channel quality degrades and the use of decision feedback equalization (DFE) in conjunction with finite impulse response (TXFIR) and receive equalization (RXEQ) filtering will be required to achieve the bit error rate (BER) performance required by more and more demanding applications. Note that the FIR function of the transmitter (TX) might be moved from the transmitter to the receiver (RX) and incorporated into the RXEQ function.

Figure 3:
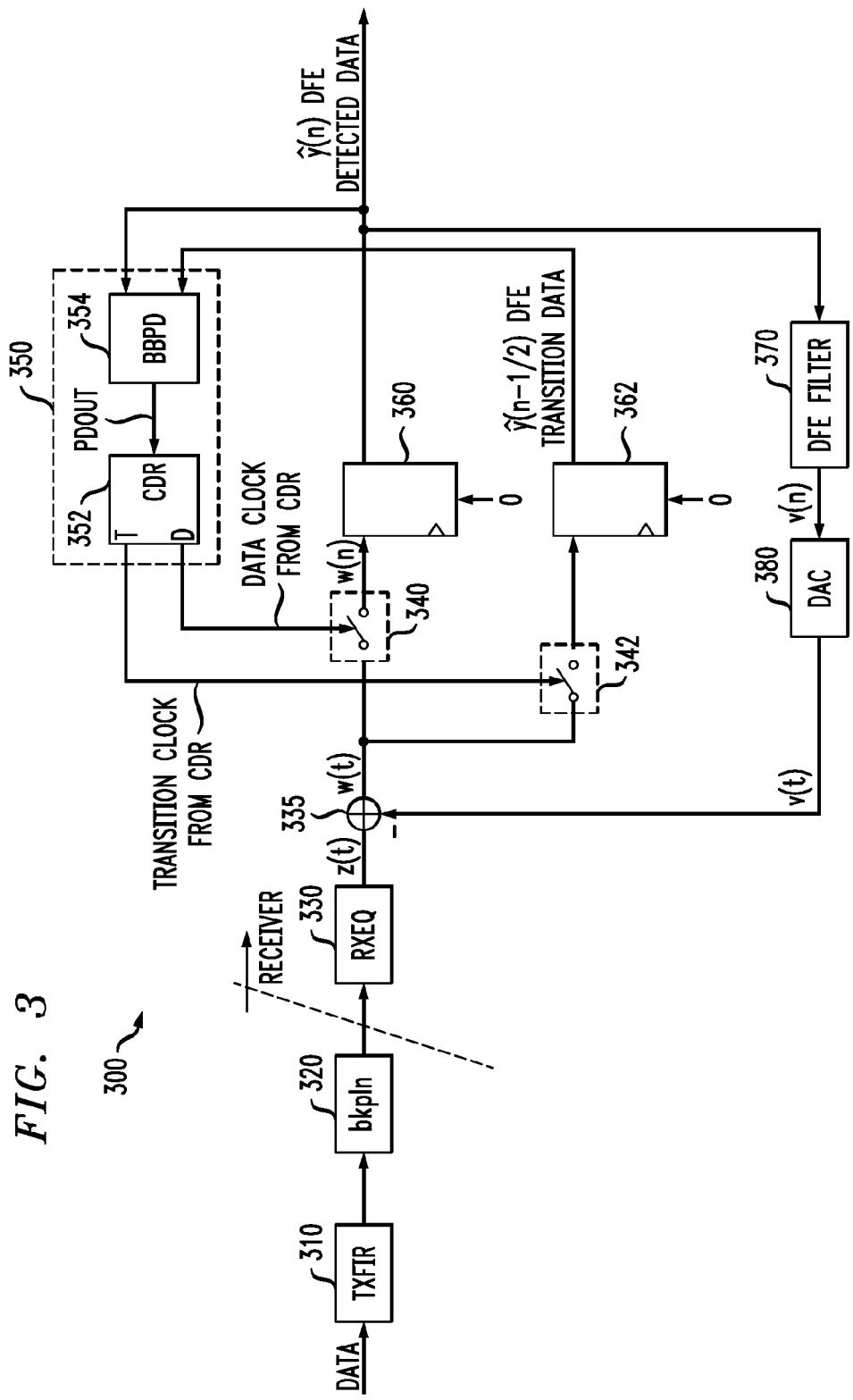
FIG. 3 is a block diagram of a serializer/deserializer communication channel incorporating a traditional DFE based equalizer.

FIG. 3 is a block diagram of a serializer/deserializer communication channel 300 that incorporates a traditional DFE based equalizer in addition to the TX and RX equalization of FIG. 1. As shown in FIG. 3, the data is transmitted through a backplane channel 320 after optionally being equalized or filtered through a transmit FIR filter (IXFIR) 310. After passing through the backplane 320, the analog signal may optionally be filtered or equalized by a receive equalizer (RXEQ) 330 which may consist, for example, of a continuous time filter. The analog signal out of the RXEQ 330 is sampled at the baud rate by a switch 340 using a sampling clock generated by a clock/data recovery (CDR) circuit 352, in a similar manner to FIG. 1.

As discussed hereinafter, a DFE correction, v(t), generated by a DFE filter 370 and digitized by a digital-to-analog converter 380 is subtracted by an analog summer 335 from the output, z(t), of the RXEQ 330 to produce a DFE corrected signal w(t).

$$w(t)=z(t)-v(t) \quad (2)$$

Then, the signal w(t) is sampled by a switch 340:

$$w(n)=w(nT) \quad (3)$$

with T being the baud period. The sampled signal w(n) is then sliced by a slicer 360 to produce the detected data $\hat{y}(n)$. The slicer output in turn is used to produce the filtered DFE output v(n) which is converted by the DAC 380 to the continuous time signal v(t). The DFE filter output 380 is given by:

$$v(n) = \sum_{l=1}^{L} b(l)\hat{y}(n-l) \quad (4)$$

where b(l) represents the coefficients of the L tap DFE.

As discussed above in conjunction with FIG. 1, the BBPD 354 requires two sampling clocks: a data sampling clock which samples the recovered data and a transition sampling clock that is offset from the data clock by half a baud period T/2 and which samples the "transition" data. The analog signal out of the RXEQ 330 is sampled at the baud rate by a switch 342 using the transition clock. The sampled signal w(n) is also sliced by a second slicer 362 to produce the detected data $\hat{y}(n-\frac{1}{2})$. The transition sample data is denoted as $\hat{y}(n-\frac{1}{2})$ to indicate is sampled relative to $\hat{y}(n)$ by a phase offset of T/2.

It is noted that the DFE filter 370 uses as its input past data decisions starting at y(n−1) and earlier. The DFE filter 370 does not use the current decision $\hat{y}(n)$. This guarantees that the operation is causal. Since an analog representation, w(t), of the DFE signal exists, it can be sampled directly by both the data clock using switch 340 (to produce w(n)) and the transition clock using switch 342 and these sampled latched signals can drive a traditional BBPD 354. For this circuit 300 to work, the entire DFE loop collection must be performed within one baud period T before the next correction is needed. At very high data rates, it is difficult to design circuits that operate this fast or to make them very accurate.

Consequently, a well known technique may be employed whereby the DFE terms are "precomputed" and chosen based upon the amplitude value of y(n) Since there is no DFE feedback loop, the process of generating the DFE "corrected" decisions can be pipelined.

Figure 4:
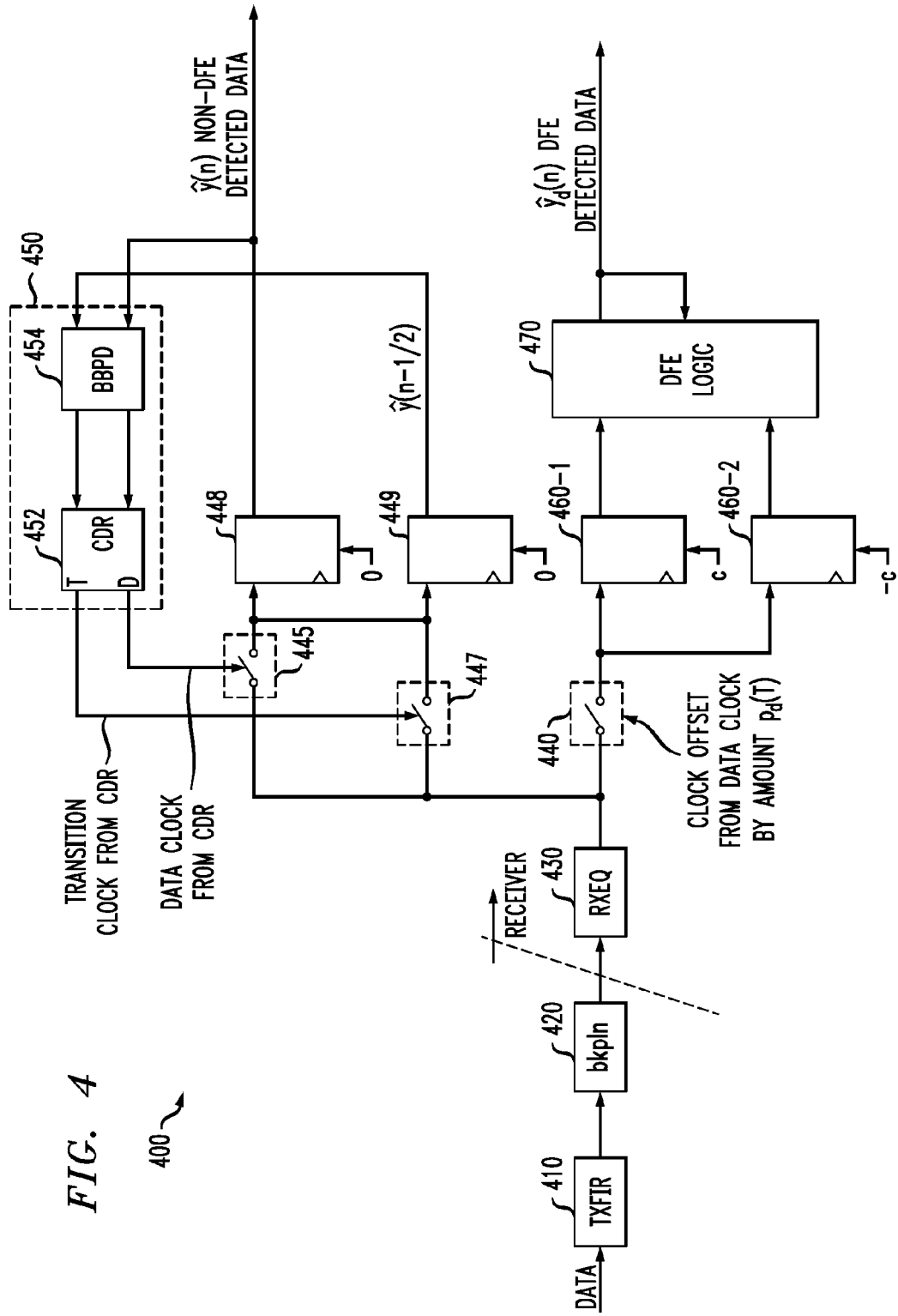
FIG. 4 is a block diagram of a serializer/deserializer communication channel that incorporates precomputation of the DFE terms.

FIG. 4 is a block diagram of a serializer/deserializer communication channel 400 that incorporates precomputation of the DFE terms, in addition to the TX and RX equalization of FIGS. 1 and 3. The exemplary embodiment shown in FIG. 4 is for a one tap (L=1) DFE that makes use of a DFE coefficient b(1). For simplicity of notation, b(1) is denoted by the variable c.

As shown in FIG. 4, the data is transmitted through a backplane channel 420 after optionally being equalized or filtered through a transmit FIR filter (TXFIR) 410. After passing though the backplane 420, the analog signal may optionally be filtered or equalized by a receive equalizer (RXEQ) 430. The analog output of the RXEQ 430 is sampled at the baud rate by switches 440, 445, 447. The switch 445 uses a data clock generated by the clock/data recovery circuit 452 and switch 447 uses a transition clock generated by the clock/data recovery circuit 452, in a similar manner to FIG. 3. Latches 448, 449 having exemplary thresholds of 0 are used to generated a decision from the non-DFE equalized signal, in a similar manner to FIG. 3.

As shown in FIG. 4, exemplary latches 460-1 and 460-2 having thresholds of c and –c, respectively, are used to generate a decision for the DFE equalized signal. The decisions from the DFE slicer latches 460 are combined by the DFE logic 470 with the previous DFE detected bit decision, $\hat{y}_d$(n–1) (represented in FIG. 4 by the arrow fed back into the DFE logic block 470) to produce the final DFE collected decision $\hat{y}_d$(n). The DFE path computation logic can be pipelined thereby eliminating the bottleneck of having to complete the computation in one baud period. The DFE logic 470 selects from the pie-computed decisions, which are the outputs of the latches 460 with thresholds c and c, based on the past decision $\hat{y}_d$(n–1).

For the case when $\hat{y}_d$(n–1)=1, $$\hat{y}_d(n) = 1 \text{ if } y(n) > c$$
$$= 0 \text{ if } y(n) < c$$

For the case when $\hat{y}_d$(n–1)=0, $$\hat{y}_d(n) = 1 \text{ if } y(n) > -c$$
$$= 0 \text{ if } y(n) < -c$$

The outputs of the latches 460 are applied to DFE logic 470 to generate the DFE corrected decision $\hat{y}_d$(n).

The DFE and non-DFE decision operations may have different optimal sampling points. Therefore, the DFE latches should be sampled with a correct sampling phase that may be offset from the normal CDR data clock sampling phase by some offset $p_d$ in units of baud interval T. Thus, the switch 440 in the DFE path is controlled by a clock that is offset from the CDR data clock by an amount equal to $p_d(T)$. A number of techniques have been proposed or suggested fox manually establishing the offset $p_d(T)$. The optimal sampling phase, however, is dependent on the channel or other equalizer settings. Thus, the sampling phase can be adaptively determined using the techniques described in United States Patent Application entitled "Method and Apparatus for Adaptively Establishing a Sampling Phase for Decision-Feedback Equalization," filed Feb. 17, 2006, and incorporated by reference herein.

It is noted that the DFE can extended to more than one tap at the expense of additional area and computation time. The exemplary DFE phase placement circuit presented herein can be extended to a system with multiple DEE taps without changing the DFE phase placement circuit. For additional taps, the number of latches and the DFE logic block would be modified, as would be apparent to a person of ordinary skill in the art.

In the DFE precomputation embodiment shown in FIG. 4, the DFE correction is not fed back to correct the output of the RXEQ 430 and the BBPD 454 is thus controlled by non-DFE detected data $\hat{y}$(n) and $\hat{y}$(n–½). Thus, the BBPD 154, 354, 454 is processing unequalized data $\hat{y}$(n) and $\hat{y}$(n–½) containing channel impairments. Methods and apparatus are employed for generating one or more clock signals for a decision-feedback equalizer using DFE detected data.

DFE Clock Generation Using DFE Detected Data

As discussed hereinafter in conjunction with FIG. 5, appropriate signals can be created to drive an oversampled phase detector, such as a BBPD, to compute the required phase adjustment for a DFE equalized signal. In particular, a "DFE transition" data $\hat{y}_{dt}$(n) are generated using rules similar to that of the regular DFE data $\hat{y}_d$(n). The DFE transition data $\hat{y}_{dt}$(n) is obtained based on the non-DFE transition sample amplitude values using the same DFE logic from which the DFE recovered data $\hat{y}_d$(n) is obtained from the non-DFE data clock sampled amplitude y(n).

DFE Equalized BBPD

Figure 5:
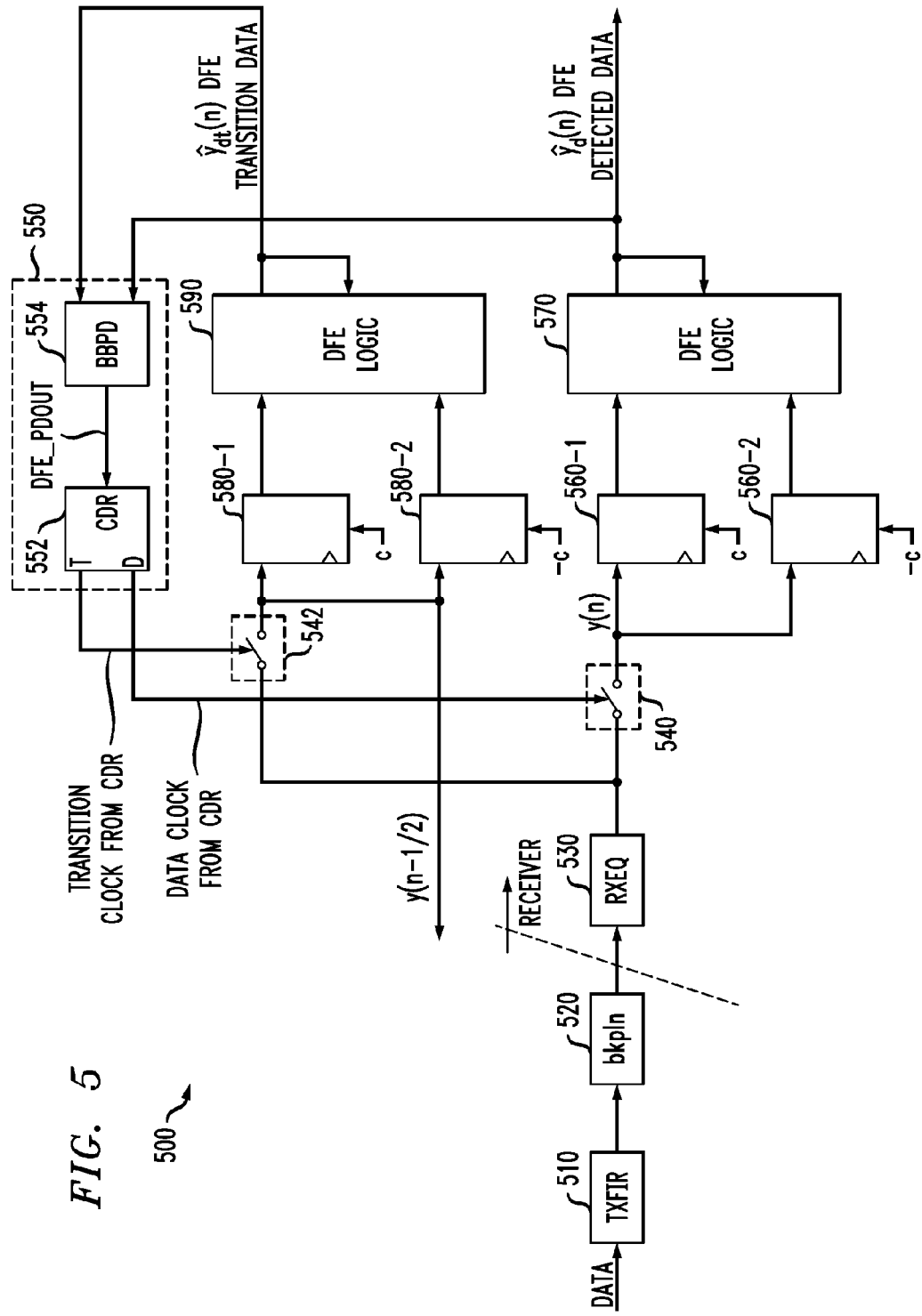
FIG. 5 is a block diagram of a serializer/deserializer communication channel.

FIG. 5 is a block diagram of a serializer/deserializer communication channel 500. The channel 500 of FIG. 5 comprises a transmit FIR filter (TXFIR) 510, backplane channel 520, RXEQ 530, switch 540, CDR circuit 550, exemplary latches 560-1 and 560-2, and DFE logic 570, in a similar manner to FIG. 4.

In addition, the channel 500 includes a switch 543, latches 580-1 and 580-2, and DFE logic 590, for the creation of the DFE transition data. The DFE transition data is created as follows:

For the case when $\hat{y}_{dt}$(n–1)=1, $$\hat{y}_{dt}(n) = 1 \text{ if } y(n-1/2) > c$$
$$= 0 \text{ if } y(n-1/2) < c$$

For the case when $\hat{y}_{dt}$(n–1)=0, $$\hat{y}_{dt}(n) = 1 \text{ if } y(n-1/2) > -c$$
$$= 0 \text{ if } y(n-1/2) < -c$$

where y(n–½) represents the amplitude of the non-DFE transition sampled data.

FIG. 6 is a sample truth table 600 for the exemplary DFE equalized BBPD 554 of FIG. 5. Generally, the truth table 600 remains the same as above, but is now driven by the DFE detected data $\hat{y}_d$(n) as well as the synthesized DFE transition data $\hat{y}_{dt}$(n) created in the manner described above.

Transition Threshold Adaptation

The discussed above have assumed that the DFE transition latch threshold c to be the same as the DFE data latch threshold. Although this has been found to work well across a wide variety of backplane channels, the CDR performance can be further improved by making the DFE transition latch threshold unequal to the DFE data latch threshold. The DFE transition latch threshold is denoted as $c_t$. Thus, $c_t$ can be unequal to c. Moreover, the DFE threshold itself may be time varying, i.e., denoted as c(n) by virtue of adapting it and so $c_t$ also would be time varying, i e., denoted as $c_t(n)$.

U.S. patent application Ser. No. 11/540,946, filed Sep. 29, 2006, entitled "Method and Apparatus for Determining Latch Position for Decision-Feedback Equalization Using Single-Sided Eye," incorporated by reference herein, discloses Single-Sided DFE Placement Techniques, incorporated herein by reference. The disclosed Single-Sided DFE Placement Techniques position the vertical slicers using a single sided eye. As used herein, a single-sided eye (also referred to as a DFE eye) contains only transitions from one binary value (i.e., only 1→x or 0→x transitions). The small data eye is the result of the channel distortions that tend to close the data eye. The Single-Sided DFE Placement Techniques recognize that a larger DFE eye can be extracted by constraining the data to only contain signal transitions from, for example, a binary value 1 to a binary value of 0 or 1 (referred to as 1→x), and inhibiting any signal transitions from a binary value of 0.

As discussed further below in conjunction with FIG. 7, when the data is constrained to only have 1→x transitions, a significant amount of distortion that would normally be associated with the 0→x transitions is removed and the resulting upper DFE eye is larger than the small data eye associated with a classical approach. Likewise, when the data is constrained to only have 0→x transitions, a significant amount of distortion that would normally be associated with the 1→x transitions is removed and the resulting lower DFE eye is larger than the small data eye associated with a classical approach. In this manner, by inhibiting one set of binary transitions, the size of the data eye is significantly increased, and the noise margin is improved.

A communication channel typically exhibits a low pass effect on a transmitted signal, causing the opening size of the received data eye to be significantly impaired, with the received data eye often being essentially closed. FIG. 7 illustrates the noise and timing margins for a received signal 700. As shown in FIG. 7, a received signal will typically include transitions 710 from a binary value 1 to a binary value of 0 or 1 (1→x), as well as transitions 720 from a binary value 0 to a binary value of 0 or 1(0→x).

The Single-Sided DFE Placement Techniques recognize that a larger DFE eye can be extracted by constraining the data to only contain signal transitions from, for example, a binary value 1 to a binary value of 0 or 1 (referred to as 1→x), and inhibiting any signal transitions from a binary value of 0 (or vice versa).

Figure 7:
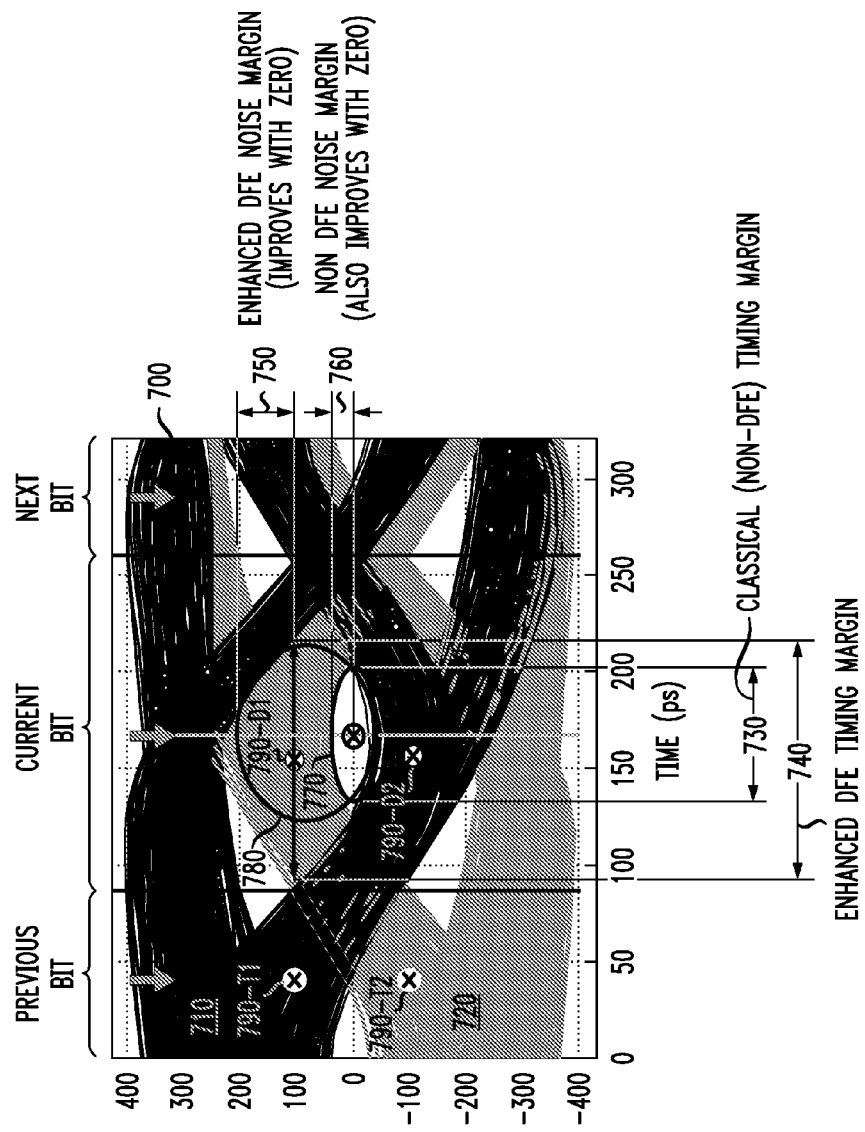
FIG. 7 illustrates the noise and timing margins for a received signal, as well as the threshold determination of one or more DFE latches in accordance with the present invention.

As shown in FIG. 7, when the full set of signal transitions is considered, the size of the classical data eye is approximately associated with the inner circle 770, having an associated timing margin 730 and noise margin 760. The small size of the data eye 770 with the corresponding poor margins 730, 760, makes it very difficult to properly recover the transmitted data. When the data is constrained to only have 1→x transitions, the distortion that would normally be associated with the 0→x transitions is removed and the resulting upper DFE eye, approximately associated with the outer circle 780, is larger than the small data eye 770 associated with a classical approach (and both sets of transitions). The upper DFE eye 780 has an associated timing margin 740 and noise margin 750. Thus, by inhibiting one set of binary transitions 710, 720, the size of the data eye 780 is significantly increased, and the timing and noise margins 740, 750 are improved relative to the corresponding non-DFE margins.

Likewise, when the data is constrained to only have 0→x transitions, a significant amount of distortion that would normally be associated with the 1→x transitions is removed and the resulting lower DFE eye is larger than the small data eye associated with a classical approach. In this manner, by inhibiting one set of binary transitions, the size of the data eye is significantly increased, and the noise and timing margins are improved.

In an exemplary embodiment shown in FIG. 7, two DFE data latches 790-D1, 790-D2 and two DFE transition latches 790-T1, 790-T2 are used to sample the data eye. A first DFE data latch 790-D1 is positioned in the vertical center of the outer circle 780 of the upper Single-Sided Eye (1→x) and a second DFE data latch 790-D2 is positioned in the vertical center of the lower Single-Sided Eye (0→x). For a more detailed discussion of DFE data latch positioning techniques, see, U.S. patent application Ser. No. 11/540,946, filed Sep. 29, 2006, entitled "Method and Apparatus for Determining Latch Position for Decision-Feedback Equalization Using Single-Sided Eye," and U.S. patent application Ser. No. 11/686,148, filed Mar. 14, 2007, entitled "Method and Apparatus for Decision-Feedback Equalization Using Single-Sided Eye with Global Minimum Convergence." The threshold of the DFE data latches 790-D1, 790-D2 are denoted herein as c.

As previously indicated, the present invention recognizes that the CDR performance can be further improved by making the DFE transition latch threshold unequal to the DFE data latch threshold. The threshold of the DFE transition latches 790-T1, 790-T2 is denoted as $c_t$. Thus, $c_t$ can be unequal to c. Moreover, the DFE threshold itself may be time varying, i.e., denoted as $c_t(n)$ by virtue of adapting it and so $c_t$ also would be time varying, i.e., denoted as $c_t(n)$. The vertical positioning of the two DFE transition latches 790-T1, 790-T2 is discussed hereinafter.

Figure 8:
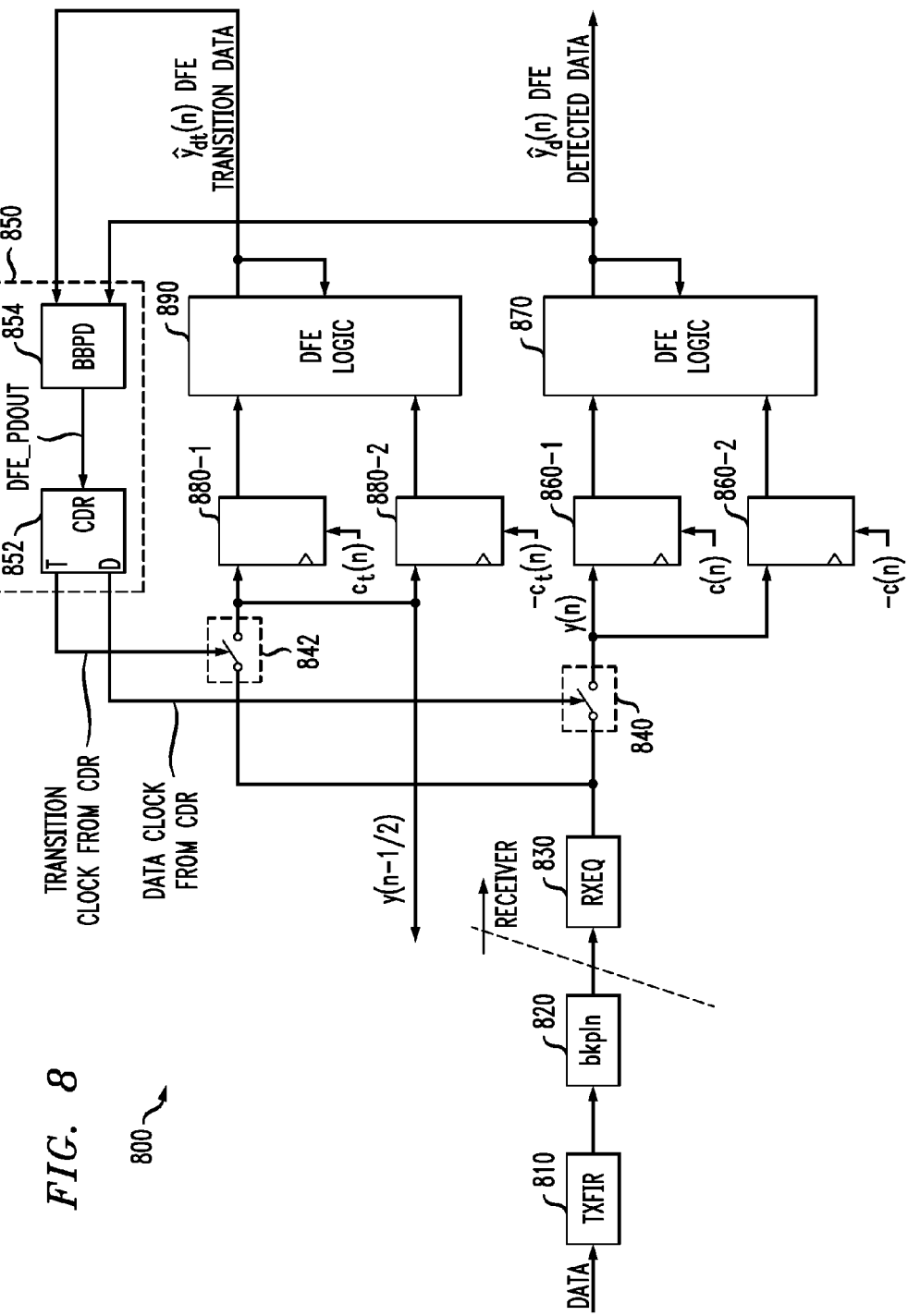
FIGS. 8 and 9 are block diagrams of serializer/deserializer communication channels in accordance with the present invention.

FIG. 8 is a block diagram of a serializer/deserializer communication channel 800 in accordance with the present invention. The channel 800 of FIG. 8 comprises a transmit FIR filter (TXFIR) 810, backplane channel 820, RXEQ 830, switch 840, CDR circuit 850, exemplary latches 860-1 and 860-2, and DFE logic 870, in a similar manner to FIGS. 4 and 5. In addition, the channel 800 includes a switch 842, latches 880-1 and 880-2, and DFE logic 890, for the creation of the DFE transition data. The DFE transition data is created as follows:

So far $c_t(n)$ changes by tracking the adaptation of the DFE threshold c(n), i.e., the ratio between $c_t(n)$ and c(n) is fixed. However, instead of keeping this ratio fixed, it may be possible to further enhance the CDR performance by determining the optimum value of $c_t$ in an adaptive manner for any given backplane and not necessarily tie the $c_t(n)$ to some fixed ratio with respect to c(n).

Eye Monitoring Based Quality Metric

Figure 9:
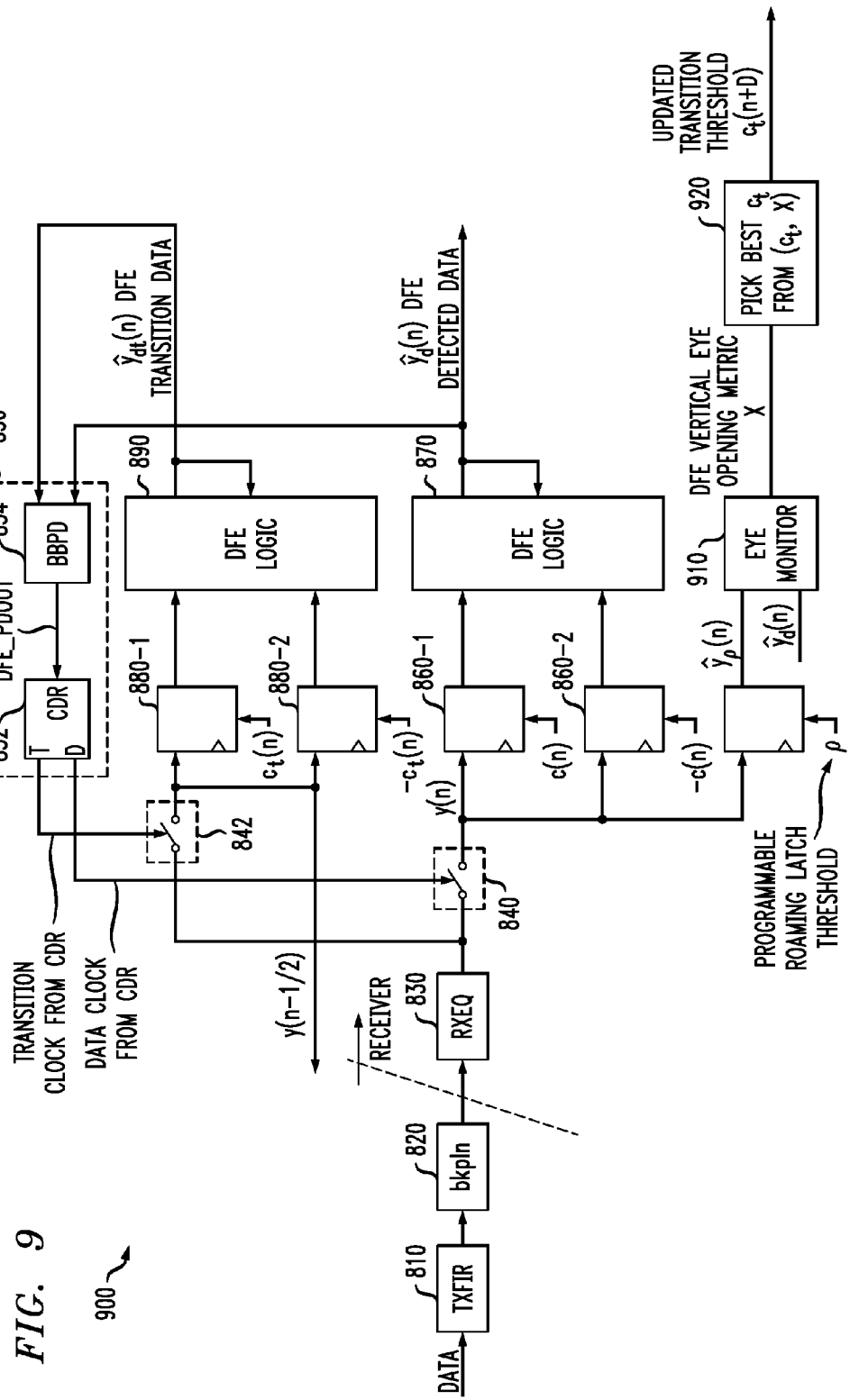

FIG. 9 is a block diagram of a serializer/deserializer communication channel 900 in accordance with the present invention. The channel 900 of FIG. 9 comprises a transmit FIR filter (IXFIR) 810, backplane channel 820, RXEQ 830, switch 840, CDR circuit 850, exemplary latches 860-1 and 860-2, DFE logic 870, switch 842, latches 880-1 and 880-2, and DFE logic 890, for the creation of the DFE transition data, in a similar manner to FIG. 8.

In addition, the channel 900 includes a data eye monitor 910 that may be implemented using the teachings of U.S. patent application Ser. No. 11/095,178, filed Mar. 31, 2005, entitled "Method and Apparatus for Monitoring a Data Eye in a Clock and Data Recovery System," incorporated by reference herein. The data eye monitor 910 can measure the quality of a DFE eye (e g, a measure of the vertical height of the data eye opening 780). The data eye monitor 910 combines information from the DFE detected data $\hat{y}_d(n)$ along with data sliced by a latch 905 at a different programmable roaming latch threshold, ρ(but clocked with the data sampling clock), referred to as $\hat{y}_p(n)$, as shown in FIG. 9.

The technique collects statistics of $(\hat{y}_d(n), \hat{y}_p(n))$ across a multitude of ρ values and over a large number of clock cycles to obtain one value at stage 920 of the DFE eye quality metric, denoted as χ. The DFE eye quality metric can now be used to adapt the DFE transition threshold to its optimum value. This quality metric is valid at the current DFE CDR data sampling clock phase.

$c_t$ values can be correlated to the corresponding DFE quality metric χ. Whenever $c_t \neq 0$, the DFE CDR sampling phase is offset with respect to the sampling phase the CDR would have chosen in the absence of any DFE information. Therefore, statistics can be collected on pair's of $(c_t, \chi)$. The dependence of χ is denoted by denoting it as $\chi(c_t)$.

Blind Startup Algorithm

A typical application will require initial training of all its equalizer and CDR parameters. In this scenario, which often occurs during some training period, there is often the luxury of searching the entire space of allowed $c_t$ values to find the optimum value. Let the space of allowed $c_t$ values have C values spaced with resolution δ. Then, the optimum value of the adapted or updated transition threshold is the one that maximizes the DFE eye metric and is given by:

$$c_t(n+D) = c_t(n) \text{ corresponding with } \chi \quad (15)$$
$$= \max_{k=0\ldots C} \chi(c_t(n) = k\delta))$$

where D reflects a delay of D clock cycles to perform the optimization.

Tracking Adaptation Algorithm

After the initial acquisition of equalizer and CDR parameters, the system enters tracking mode where the serializer/deserializer (serdes) receiver is expected to track minor variations to its environment. In this scenario, the transition threshold is adapted based on examining incremental deviations from its present value. Here, the transition threshold is adapted as follows to obtain the one that maximizes the DFE eye metric as follows:

$$c_t(n+D) = \arg \text{ to } \chi \text{ corresponding with } \chi = \max \chi(c_t(n)),$$
$$\chi(c_t(n)-\delta), \chi(c_t(n)+\delta)) \quad (16)$$

where $c_t(n+D)$ is the updated transition threshold obtained after a delay of D clock cycles to reflect the delay in collection of statistics and making the decisions to determine the optimum threshold.

Variations

The phase detector need not only be of the BBPD type described here. Non-DFE phase detectors are described in Y. Choi et al, "Jitter Transfer Analysis of Tracked Oversampling Techniques for Multigigabit Clock and Data Recovery," IEEE Trans. on Circuits and Systems, 775-83, (November 2003). In U.S. patent application Ser. No. 11/356,690, filed Feb. 17, 2006, entitled, "Method And Apparatus For Adaptively Establishing A Sampling Phase For Decision-Feedback Equalization," example DFE phase detectors are described with four level outputs that can be termed as "quasi-linear" phase detectors (QLPD)s. Moreover, the QLPDs could be of the horizontal type or the vertical type. The transition adaptation techniques described herein can be extended to such phase detectors with additional levels. In the case of the four level "horizontal" DFE QLPDs, for example, there are additional clock signals other than the data and transition clock. There would be "early" and "late" clocks, which clock early and late latches with "early" and "late" thresholds, denoted as $c_e(n)$ and $c_l(n)$. Thus, the early and late thresholds can also be adapted using the technique described herein for adapting the transition threshold $c_t(n)$. For the exemplary foul level "vertical" DFE QLPD, there is still only data and transition clocks so only the transition threshold need be adapted as is the case for the BBPD example considered here.

The examples shown herein are for a one tap DFE only. This entire architecture can be extended with more complexity to additional DFE taps, as would be apparent to a person of ordinary skill in the art. The logic equations to generate $\hat{y}_{dt}(n)$, $\hat{y}_d(n)$ (or additional signals if considering a phase detector with more levels) will change accordingly.

The DFE logic examples shown for the one tap DFE including logic to generate DFE transition, early, and late data for the DFE phase detectors assume an equivalent positive DFE coefficient, i.e., b(1)=c, where c>0. As would be apparent to one of ordinary skill in the art, the corresponding logic is easily derived for c<0.

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or mote aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

It is to be understood that the embodiments and variations shown and described herein are merely illustrative of the principles of this invention and that various modifications may be implemented by those skilled in the art without departing from the scope and spirit of the invention.

We claim:

1. A method for determining a threshold position of at least one pair of transition latches employed by a decision-feedback equalizer, comprising:

obtaining a plurality of samples of a data eye using a data eye monitor;

obtaining a vertical eye opening metric from said data eye monitor; and determining a magnitude of said threshold position for said at least one pair of transition latches based on said vertical eye opening metric, wherein said threshold position of said transition latches in said at least one pair of transition latches have opposite magnitude values and wherein said at least one pair of transition latches is clocked using a transition clock having a phase that is offset from a data clock by approximately one-half of a sampling period of said data clock.

2. The method of claim 1, wherein said vertical eye opening metric is based on statistics of DFE detected data and samples obtained using at least one roaming latch.

3. The method of claim 1, wherein said vertical eye opening metric measures a degree of opening of a data eye.

4. The method of claim 2, wherein said at least one roaming latch samples said data eye for a plurality of voltage settings.

5. The method of claim 1, wherein said data eye is a single-sided data eye.

6. The method of claim 5, wherein said single-sided data eye only contains transitions from a first binary value to a binary value of 0 or 1.

7. The method of claim 1, wherein said vertical eye opening metric is obtained for a plurality of transition latch settings and wherein said step of determining said magnitude of said threshold position for said at least one pair of transition latches selects said transition latch setting that approximately maximizes said vertical eye opening metric.

8. A decision-feedback equalizer, comprising:

at least one data latch having a data threshold; and at least one pair of transition latches having a transition threshold, wherein said transition threshold of said transition latches in said at least one pair of transition latches have opposite magnitude values, wherein said transition threshold and said data threshold are unequal, wherein said at least one pair of transition latches is clocked using a transition clock and said at least one data latch is clocked using a data clock, wherein said transition clock has a phase that is offset from said data clock by approximately one-half of a sampling period of said data clock.

9. The decision-feedback equalizer of claim 8, wherein said at least one transition threshold may vary over time.

10. The decision-feedback equalizer of claim 8, further comprising a data eye monitor for generating a vertical eye opening metric that is used to determine said transition threshold.

11. The decision-feedback equalizer of claim 10, wherein said vertical eye opening metric is based on statistics of DFE detected data and samples obtained using at least one roaming latch.

12. The decision-feedback equalizer of claim 10, wherein said vertical eye opening metric measures a degree of opening of a data eye.

13. The decision-feedback equalizer of claim 11, wherein said at least one roaming latch samples said data eye for a plurality of voltage settings.

14. The decision-feedback equalizer of claim 12, wherein said data eye is a single-sided data eye.

15. The decision-feedback equalizer of claim 14, wherein said single-sided data eye only contains transitions from a first binary value to a binary value of 0 or 1.

16. The decision-feedback equalizer of claim 10, wherein said vertical eye opening metric is obtained for a plurality of transition latch settings and wherein said step of determining said magnitude of said threshold position for said at least one pair of transition latches selects said transition latch setting that approximately maximizes said vertical eye opening metric.

17. A communications receiver for receiving a received signal, comprising:

a decision-feedback equalizer comprising:

at least one data latch having a data threshold; and at least one pair of transition latches having a transition threshold, wherein said transition threshold of said transition latches in said at least one pair of transition latches have opposite magnitude values, wherein said transition threshold and said data threshold are unequal, wherein said at least one pair of transition latches is clocked using a transition clock and said at least one data latch is clocked using a data clock, wherein said transition clock has a phase that is offset from said data clock by approximately one-half of a sampling period of said data clock.

18. The communications receiver of claim 17, wherein said at least one transition threshold may vary over time.

19. The communications receiver of claim 17, further comprising a data eye monitor for generating a vertical eye opening metric that is used to determine said transition threshold.

20. The communications receiver of claim 19, wherein said vertical eye opening metric is based on statistics of DFE detected data and samples obtained using at least one roaming latch.

21. The communications receiver of claim 19, wherein said vertical eye opening metric measures a degree of opening of a data eye.

22. The communications receiver of claim 19, wherein said vertical eye opening metric is obtained for a plurality of transition latch settings and wherein said step of determining said magnitude of said threshold position for said at least one pair of transition latches selects said transition latch setting that approximately maximizes said vertical eye opening metric.

* * * * *